US010283993B2

(12) United States Patent
Deng (10) Patent No.: US 10,283,993 B2
(45) Date of Patent: May 7, 2019

(54) CHARGING METHOD AND MOBILE TERMINAL (71) Applicant: Guangdong Oppo Mobile Telecommunications Corp., Ltd., Dongguan, Guangdong (CN)

(72) Inventor: Nanwei Deng, Guangdong (CN)

(73) Assignee: Guangdong Oppo Mobile Telecommunications Corp., Ltd., Dongguan, Guangdong (CN)

(*) Notice: Subject to any disclaimer, the term of this patent is extended or adjusted under 35 U.S.C. 154(b) by 0 days.

(21) Appl. No.: 16/196,436

(22) Filed: Nov. 20, 2018

(65) Prior Publication Data

US 2019/0089166 A1 Mar. 21, 2019

Related U.S. Application Data (63) Continuation of application No. 15/561,140, filed as application No. PCT/CN2016/080819 on Apr. 29, 2016.

(30) Foreign Application Priority Data

Dec. 3, 2015 (CN) .......................... 2015 1 0884669

(51) Int. Cl.
*H02J 7/00* (2006.01)
(52) U.S. Cl.
CPC .............. *H02J 7/007* (2013.01); *H02J 7/00* (2013.01); *H02J 7/0047* (2013.01); *H02J 7/0073* (2013.01)
(58) Field of Classification Search
USPC .......................................................... 320/160
See application file for complete search history.

(56) References Cited

U.S. PATENT DOCUMENTS 5,442,274 A * 8/1995 Tamai .................. H02J 7/0093
320/146
5,561,360 A * 10/1996 Ayres .................... H01M 10/44
320/129

(Continued)

FOREIGN PATENT DOCUMENTS

CN          1088718 A     6/1994
CN       101488591 A      7/2009

(Continued)

OTHER PUBLICATIONS

International search report issued in corresponding international application No. PCT/CN2016/080819 dated Sep. 7, 2016.

*Primary Examiner* — Samuel Berhanu
(74) *Attorney, Agent, or Firm* — Young Basile Hanlon & MacFarlane, P.C.

(57) ABSTRACT

A charging method and a mobile terminal are provided. The method includes the following. An initial cut-off voltage and an initial charging current of a battery are set when the battery is subjected to constant current charging. The initial cut-off voltage is greater than a safe cut-off voltage of the battery. A battery voltage of the battery is detected. Whether the current battery voltage is equal to the initial cut-off voltage is determined. The initial cut-off voltage and initial charging current are gradually decreased when the current battery voltage is equal to the initial cut-off voltage, until the initial cut-off voltage is less than or equal to the safe cut-off voltage, and the battery is charged in constant voltage charging when the current battery voltage is equal to the safe cut-off voltage, where a voltage of the constant voltage charging is the safe cut-off voltage.

16 Claims, 4 Drawing Sheets (56) References Cited

U.S. PATENT DOCUMENTS

| | | | | |
|---|---|---|---|---|
| 5,617,007 | A * | 4/1997 | Keidl | H01M 10/44 320/141 |
| 6,087,810 | A * | 7/2000 | Yoshida | H02J 7/0077 320/139 |
| 6,307,353 | B1 * | 10/2001 | Shiojima | H01M 10/44 320/139 |
| 7,504,803 | B2 * | 3/2009 | Cho | H02J 7/0093 320/139 |
| 9,293,940 | B2 * | 3/2016 | Lim | H02J 7/0083 |
| 2006/0043932 | A1 * | 3/2006 | Nishida | H02J 7/0073 320/128 |
| 2008/0309293 | A1 * | 12/2008 | Kung | H01M 10/441 320/160 |
| 2009/0153104 | A1 * | 6/2009 | Matsuura | H02J 7/0091 320/153 |

FOREIGN PATENT DOCUMENTS

| | | |
|---|---|---|
| CN | 102237558 A | 11/2011 |
| CN | 103107378 A | 5/2013 |
| CN | 103490111 A | 1/2014 |
| CN | 103730915 A | 4/2014 |
| CN | 105098913 A | 11/2015 |
| EP | 0851556 A2 | 7/1998 |

* cited by examiner

CHARGING METHOD AND MOBILE TERMINAL

CROSS-REFERENCE TO RELATED APPLICATION(S)

This application is a continuation of U.S. application Ser. No. 15/561,140, filed on Sep. 25, 2017, which is a National Phase of PCT Patent Application No. PCT/CN2016/080819, filed on Apr. 29, 2016, which claims priority to Chinese Patent Application No. 201510884669.6, filed on Dec. 3, 2015. The contents of the above applications are all incorporated by reference in their entireties.

TECHNICAL FIELD

The present disclosure relates to a technical field of communication, and more particularly relates to a charging method and a mobile terminal.

BACKGROUND

Mobile terminals, such as mobile phones and tablet computers, currently use lithium batteries for power supply. Charging methods of the lithium batteries are generally classified into four stages that include trickle charging, pre-charging, constant current charging, and constant voltage charging. Since the constant current charging method uses a larger charging current, the lithium battery can be quickly charged and thus, decreasing charging time of the lithium battery. When lithium battery voltage reaches a safe cut-off voltage, the lithium battery is subjected to the constant voltage charging. In order to ensure safety of the lithium battery, the safe cut-off voltage is generally set as a fixed value and is lower than a safe voltage of the lithium battery. However, in an actual charging procedure, the lithium battery voltage measured by a power management chip is often higher than a real voltage of the lithium battery due to an internal resistance of the lithium battery. Thus, constant current charging time of the lithium battery is shorter, meanwhile constant voltage charging time of the lithium battery is extended, such that total charging time of the lithium battery is longer.

SUMMARY

Implementations of the present disclosure provide a charging method and a mobile terminal so that charging time of a battery can be reduced.

According to a first aspect of the disclosure, a charging method is provided. The method includes the following operations.

An initial cut-off voltage and an initial charging current of a battery are set when the battery is subjected to constant current charging, where the initial cut-off voltage is greater than a safe cut-off voltage of the battery, and a difference between the initial cut-off voltage and the safe cut-off voltage is less than or equal to a preset voltage difference. A battery voltage of the battery is detected. Whether the current battery voltage is equal to the initial cut-off voltage is determined. The initial cut-off voltage and the initial charging current is decreased gradually based on a determination that the current battery voltage is equal to the initial cut-off voltage, until the initial cut-off voltage is less than or equal to the safe cut-off voltage. The battery is charged in constant voltage charging when the current battery voltage is equal to the safe cut-off voltage, where a voltage of the constant voltage charging is the safe cut-off voltage.

According to a second aspect of the disclosure, a mobile terminal is provided. The mobile terminal includes a setting unit, a detecting unit, a determining unit, and an adjusting unit.

The setting unit is configured to set an initial cut-off voltage and an initial charging current of a battery when the battery is subjected to constant current charging, where the initial cut-off voltage is greater than a safe cut-off voltage of the battery, and a difference between the initial cut-off voltage and the safe cut-off voltage is less than or equal to a preset voltage difference.

The detecting unit is configured to detect a battery voltage of the battery, where the battery voltage is a sum of a real voltage of the battery and a voltage of an inner resistor of the battery.

The determining unit is configured to determine whether the current battery voltage is equal to the initial cut-off voltage; and The adjusting unit is configured to decrease the initial cut-off voltage and the initial charging current gradually when the determining unit determines that the current battery voltage is equal to the initial cut-off voltage, until the initial cut-off voltage is less than or equal to the safe cut-off voltage, and to charge the battery in constant voltage charging when the current battery voltage is equal to the safe cut-off voltage, where a voltage of the constant voltage charging is the safe cut-off voltage.

BRIEF DESCRIPTION OF THE DRAWINGS

The following implementations refer to the accompanying drawings for exemplifying specific implementable implementations of the present disclosure. It should be noted that the following drawing are exemplary implementations and persons of ordinary skill in the art, without paying any creative effort, can obtain other drawings based on these drawings, where.

DETAILED DESCRIPTION

The following implementations refer to the accompanying drawings for exemplifying specific implementable implementations of the present disclosure in a suitable computing environment, where similar numerals denote the same elements. It should be noted that the exemplary described implementations are configured to describe and understand the present disclosure, but the present disclosure is not limited thereto.

Implementations of the present disclosure provide a charging method and a mobile terminal so that charging time of a battery can be reduced. Details are described below.

Figure 1:
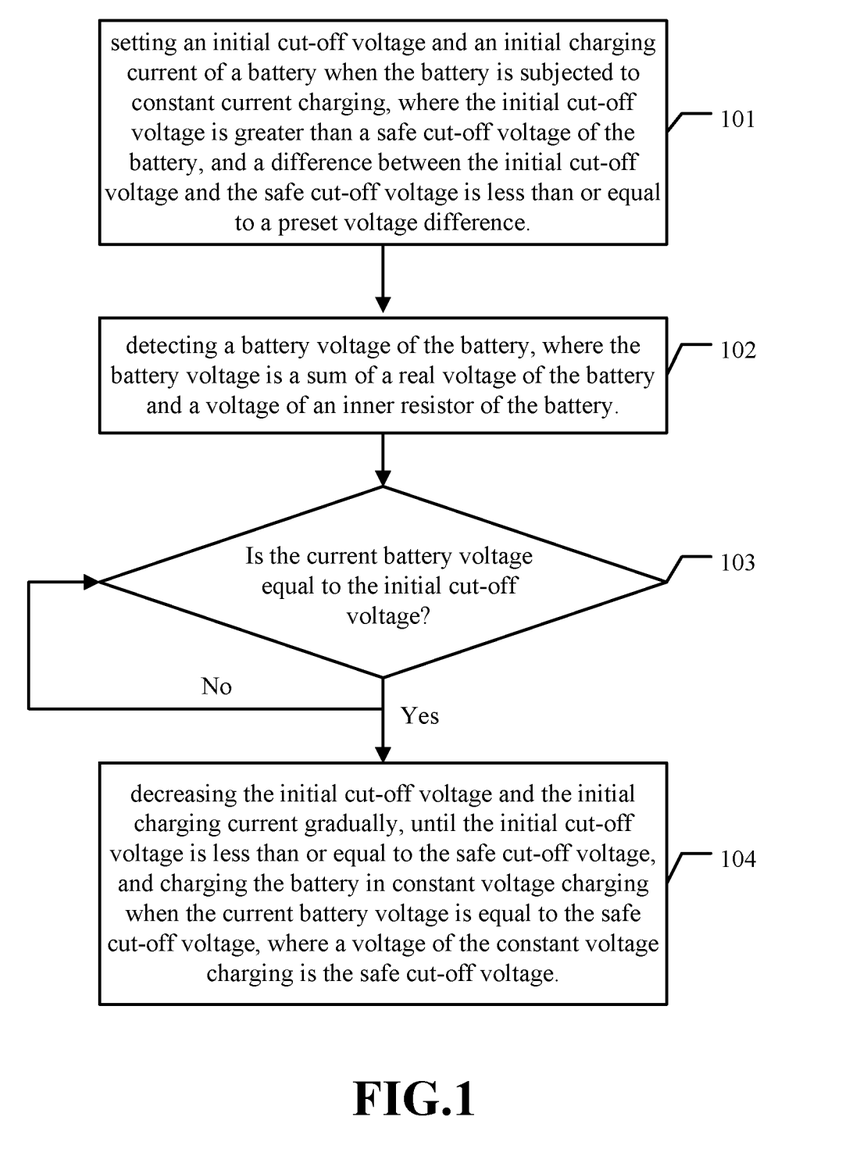
FIG. 1 is an illustrative flowchart of a charging method according to one implementation of the present disclosure.

FIG. 1 is an illustrative flowchart of a charging method according to one implementation of the present disclosure. As illustrated in FIG. 1, the charging method includes following actions.

At block 101, when a battery is subjected to constant current charging, an initial cut-off voltage and an initial charging current of the battery are set, where the initial cut-off voltage is greater than a safe cut-off voltage of the battery, and a difference between the initial cut-off voltage and the safe cut-off voltage is less than or equal to a preset voltage difference.

In one implementation of the present disclosure, a battery charging procedure are generally classified into four stages that include trickle charging, pre-charging, constant current charging, and constant voltage charging. When battery power is very low and a present value of a battery voltage (in other word, the current battery voltage) is low, the battery is subjected to the trickle charging (i.e., smaller current charging). When the present value of battery voltage reaches a preset threshold, the battery is subjected to the pre-charging. When the pre-charging finishes, the battery is subjected to the constant current charging (i.e., quick charging). When the present value of battery voltage reaches a cut-off voltage, the battery is subjected to the constant voltage charging until the battery power of the battery is full. In the implementations of the present disclosure, the charging method adjusts the cut-off voltage of the constant current charging and thus, constant current charging time increases and constant voltage charging time decreases so that total charging time of the battery can be reduced.

In one implementation of the present disclosure, when the battery is subjected to the constant current charging, the initial cut-off voltage and the initial charging current are set. The initial cut-off voltage is defined as a cut-off voltage when the battery is subjected to the constant current charging. The initial cut-off voltage is greater than a safe cut-off voltage of the battery. The battery includes a core material and a circuit electrically connected to the core material. The safe cut-off voltage of the battery is less than a safe voltage of the battery, where the safe voltage of the battery is determined by measuring a voltage of the core material within the battery. For example, the safe voltage of the battery is selected from one group consisting of 4.3V, 4.35V and 4.4V based on voltage measurements of different types of core materials within the batteries. In one implementation, if the safe voltage of the battery includes voltage measurement 4.3V of the core material within the battery, the safe cut-off voltage of the battery is set as 4.25V and the initial cut-off voltage of the battery is set as 4.35V. The preset voltage difference is set as a fixed value (e.g., 100 mV). For example, in order to ensure the safety of constant voltage charging, the safe cut-off voltage is less than the safe voltage of the battery by a difference 50 mV. The initial charging current is a current of the constant current charging. The initial charging current is selected from one group consisting of 800 mA, 1000 mA and 1200 mA based on different battery capacities. Higher battery capacity generally means larger initial charging current.

In at least one implementation, the setting an initial cut-off voltage and an initial charging current of a battery further includes the following actions.

The safe cut-off voltage of the battery is detected.

Based on a mapping relationship between the safe cut-off voltage and the initial cut-off voltage, the initial cut-off voltage of the battery is set.

Based on a mapping relationship between the initial cut-off voltage and the initial charging current, the initial charging current of the battery is set.

In one implementation of the present disclosure, different types of core materials of the battery include safe cut-off voltages. A charging chip is used to detect the safe cut-off voltage of the battery. The mapping relationship between the safe cut-off voltage and the initial cut-off voltage is pre-stored in a mobile terminal. For example, safe cut-off voltage 4.25V corresponds to initial cut-off voltage 4.35V, safe cut-off voltage 4.3V corresponds to initial cut-off voltage 4.4V, and safe cut-off voltage 4.35V corresponds to initial cut-off voltage 4.45V. The mapping relationship between the initial cut-off voltage and the initial charging current is pre-stored in the mobile terminal. For example, the initial cut-off voltage 4.35V corresponds to the initial charging current 1000 mA, the initial cut-off voltage 4.4V corresponds to the initial charging current 1100 mA, and the initial cut-off voltage 4.45V corresponds to the initial charging current 1200 mA. In one implementation of the present disclosure, the safe cut-off voltage of the battery is detected based on different types of core materials such that the initial cut-off voltage and the initial charging current of the battery are configured.

At block 102, a battery voltage of the battery is detected, where the battery voltage is a sum of a real voltage of the battery and a voltage of an inner resistor of the battery.

In one implementation, a charging chip of the mobile terminal detects the battery voltage of the battery. It should be noted that, since the battery includes an internal resistance in a charging process, the detected battery voltage is defined as a voltage containing a voltage of the inner resistor of the battery and is greater than a real voltage of the battery.

At block 103, whether the current battery voltage is equal to the initial cut-off voltage is determined.

In one implementation, whether the current battery voltage is equal to the initial cut-off voltage is determined. When the current battery voltage is less than the initial cut-off voltage, the battery is still in the constant current charging and the block 103 is performed. When the current battery voltage is equal to the initial cut-off voltage, a block 104 is performed.

In one implementation, when the current battery voltage is unequal to the initial cut-off voltage, the block 103 is continuously performed.

At the block 104, the initial cut-off voltage and the initial charging current are gradually decreased, until the initial cut-off voltage is less than or equal to the safe cut-off voltage, and charge the battery in constant voltage charging when the current battery voltage is equal to the safe cut-off voltage, where a voltage of the constant voltage charging is the safe cut-off voltage.

In one implementation, when the current battery voltage is equal to the initial cut-off voltage, the initial cut-off voltage and the initial charging current are gradually decreased. For example, the initial cut-off voltage is 4.35V, the safe cut-off voltage is 4.25V, and the initial charging current is 1000 mA. When the current battery voltage is 4.35V, the initial cut-off voltage decreases to 4.34V and the initial charging current decreases to 950 mA. When the current battery voltage is 4.34V, the initial cut-off voltage decreases to 4.335V and the initial charging current decreases to 925 mA. When the current battery voltage is 4.335V, the initial cut-off voltage decreases to 4.32V and the initial charging current decreases to 850 mA, until the current battery voltage is less than or equal to 4.25V, and then the battery is subjected to the constant voltage stage, where a voltage of the constant voltage stage is 4.25V. In one implementation, the initial cut-off voltage of the battery is greater than the safe cut-off voltage. When the current battery voltage is equal to the initial cut-off voltage, the initial cut-off voltage and the initial charging current are gradually decreased until the initial cut-off voltage is less than or equal to the safe cut-off voltage, and then the battery is subjected to the constant voltage stage. In one implementation, constant current charging time of the battery increases and constant voltage charging time of the battery decreases such that total charging time of the battery can be reduced.

In one implementation, the block 104 further includes the following actions.

The initial cut-off voltage decreases by a first preset value to function as a current cut-off voltage, and the initial charging current decreases by a second preset value to function as a current charging current.

Whether the current cut-off voltage is greater than the safe cut-off voltage is determined. If the current cut-off voltage is greater than the safe cut-off voltage, whether the current battery voltage is equal to the current cut-off voltage is determined. If the current cut-off voltage is less than or equal to the safe cut-off voltage, the battery is subjected to the constant voltage charging.

Whether the current battery voltage is equal to the current cut-off voltage is determined. If the current battery voltage is equal to the current cut-off voltage, the current cut-off voltage decreases by the first preset value to function as a new current cut-off voltage, and the current charging current decreases by the second preset value to function as a new current charging current. If the current battery voltage is unequal to the current cut-off voltage, whether the current battery voltage is equal to the current cut-off voltage is continuously performed.

The current cut-off voltage decreases by the first preset value to function as a new current cut-off voltage, and the current charging current decreases by the second preset value to function as a new current charging current. Whether the current cut-off voltage is greater than the safe cut-off voltage is determined, and charge the battery in the constant voltage charging when the current cut-off voltage is less than or equal to the safe cut-off voltage.

In one implementation, the initial cut-off voltage is gradually decreased, where the initial cut-off voltage decreases by a first preset value to function as a current cut-off voltage. The initial charging current is gradually decreased, where the initial charging current decreases by a second preset value to function as a current charging current. The first preset value can be selected from one group consisting of 10 mV, 15 mV, and 25 mV. The second preset value can be selected from one group consisting of 10 mA, 20 mA, and 25 mA. For example, the first preset value can be set as 25 mV and the second preset value can be set as 25 mA.

For example, the first preset value is 25 mV and the second preset value is 25 mA, in conjunction with FIG. 2, to be described below.

Figure 2:
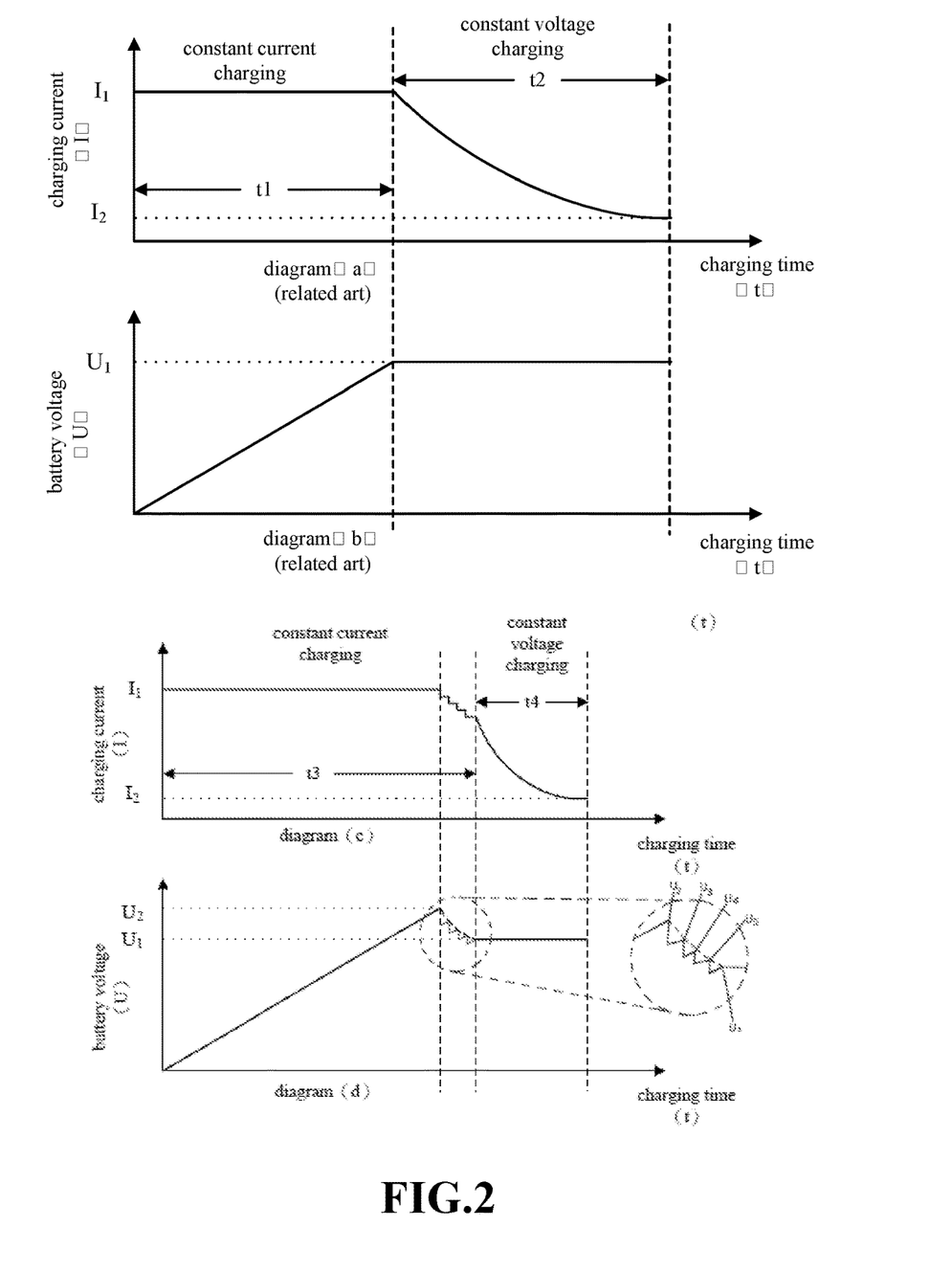
FIG. 2 is an illustrative diagram of changes of charging current and a battery voltage over charging time according to one implementation of the present disclosure.

FIG. 2 is an illustrative diagram of changes of charging current and a battery voltage over charging time according to one implementation of the present disclosure. As illustrated in FIG. 2, diagrams (a) and (b) in FIG. 2 depict the changes of charging current and the battery voltage over the charging time in a related art. Diagrams (c) and (d) depict the changes of charging current and the battery voltage over charging time according to one implementation of the present disclosure. For illustration convenience, FIG. 2 only illustrates the constant current charging and constant voltage charging. The diagram (a) depicts the change of the charging current over the charging time in the related art. The diagram (b) depicts the change of the battery voltage over the charging time in the related art. The diagram (c) depicts the change of the charging current over the charging time according to one implementation of the present disclosure. The diagram (d) depicts the change of the battery voltage over the charging time according to one implementation of the present disclosure.

As illustrated in FIG. 2, the initial cut-off voltage (i.e., $U_2$ in diagram (d)) is 4.35V, the safe cut-off voltage (i.e., $U_1$ in diagrams (b) and (d)) is 4.25V, and the initial charging current (i.e., $I_1$ in diagrams (a) and (c)) is 1000 mA. A final charging current (i.e., $I_2$ in diagrams (a) and (c)) is provided in the constant voltage charging. In the constant current charging, as the charging time increases, the battery voltage gradually increases, where the charging current (i.e., the initial charging current) is 1000 mA. When the current battery voltage reaches 4.25V (i.e., the safe cut-off voltage), the battery directly is subjected to constant voltage stage in the related art. In one implementation of the present disclosure, since the initial cut-off voltage is set as 4.35V, the battery is continuously charged by 1000 mA. When the current battery voltage reaches 4.35V, the current battery voltage is equal to the initial cut-off voltage. Meanwhile, the initial cut-off voltage (4.35V) decreases by the first preset value (25 mV) to function as the current cut-off voltage (4.325V), and the initial charging current (1000 mA) decreases by the second preset value (25 mA) to function as a current charging current (975 mA). It is determined that the current cut-off voltage (4.325V) is greater than the safe cut-off voltage 4.25V. It is further determined whether the current battery voltage is equal to the current cut-off voltage (4.325V). If the current battery voltage is unequal to the current cut-off voltage (4.325V), whether the current battery voltage is equal to the current cut-off voltage (4.325V) is continuously determined. Meanwhile, since the current battery voltage increases over the charging time and when the current battery voltage is equal to the current cut-off voltage (4.325V), the current cut-off voltage (4.325V) decreases by the first preset value (25 mV) to function as the current cut-off voltage (4.3V), and the current charging current (975 mA) decreases by the second preset value (25 mA) to function as a new current charging current (950 mA). In this time, the battery is charged by the new current charging current (950 mA) in the constant current charging. It is determined that the current cut-off voltage (4.3V) is greater than the safe cut-off voltage 4.25V. It is further determined whether the current battery voltage is equal to the current cut-off voltage (4.3V). If the current battery voltage is unequal to the current cut-off voltage (4.3V), whether the current battery voltage is equal to the current cut-off voltage (4.3V) is continuously determined. When the current battery voltage is equal to the current cut-off voltage (4.3V), the current cut-off voltage (4.3V) decreases by the first preset value (25 mV) to function as the current cut-off voltage (4.275V), and the current charging current (950 mA) decreases by the second preset value (25 mA) to function as a new current charging current (925 mA). In this time, the battery is charged by the new current charging current (925 mA) in the constant current charging. It is determined that the current cut-off voltage (4.275V) is greater than the safe cut-off voltage 4.25V. It is further determined whether the current battery voltage is equal to the current cut-off voltage (4.275V). If the current battery voltage is unequal to the current cut-off voltage (4.275V), whether the current battery voltage is equal to the current cut-off voltage (4.275V) is continuously determined. When the current battery voltage is equal to the current cut-off voltage (4.275V), the current cut-off voltage (4.275V) decreases by the first preset value (25 mV) to function as the current cut-off voltage (4.25V), and the current charging current (925 mA) decreases by the second preset value (25 mA) to function as a new current charging current (900 mA). In this time, the battery is charged by the new current charging current (900 mA) in the constant current charging. It is determined that the current cut-off voltage (4.25V) is equal to the safe cut-off voltage 4.25V. In this time, the battery is subjected to the constant voltage charging. As illustrated in FIG. 2, the charging time of the constant current charging is t1 and the charging time of the constant voltage charging is t2 in the related art. In one implementation of the present disclosure, the charging time of the constant current charging is t3 and the charging time of the constant voltage charging is t4. Although the charging time t3 is greater than the charging time t3, however, the charging time t4 is significantly less than the charging time t2. While charging the battery having same battery capacity, total charging time (t1+t2) is greater than total charging time (t3+t4) and thus, the total charging time of the battery effectively is reduced according to one implementation of the present disclosure.

In one implementation, the difference between the initial cut-off voltage and the safe cut-off voltage is K times of the first preset value, where K is a positive integer.

For example, when the initial cut-off voltage is 4.35V and the safe cut-off voltage is 4.25V, the first preset value is set as 10 mV. The difference between the initial cut-off voltage and the safe cut-off voltage is 100 mV. Thus, the difference between the initial cut-off voltage and the safe cut-off voltage is ten times of the first preset value.

In the implementations of the present disclosure, when the battery is subjected to constant current charging, an initial cut-off voltage and an initial charging current of the battery are set, where the initial cut-off voltage is greater than the safe cut-off voltage of the battery. The difference between the initial cut-off voltage and the safe cut-off voltage is less than or equal to a preset voltage difference. The battery voltage of the battery is detected. It is determined whether the current battery voltage is equal to the initial cut-off voltage. When the current battery voltage is equal to the initial cut-off voltage, the initial cut-off voltage and the initial charging current are gradually decreased until the initial cut-off voltage is less than or equal to the safe cut-off voltage, and then the battery is subjected to the constant voltage stage, where a voltage of the constant voltage stage is the safe cut-off voltage. In one implementation, when the initial cut-off voltage is greater than the safe cut-off voltage of the battery, the constant current charging time of the battery increases and the constant voltage charging time of the battery decreases such that total charging time of the battery can be reduced.

Figure 3:
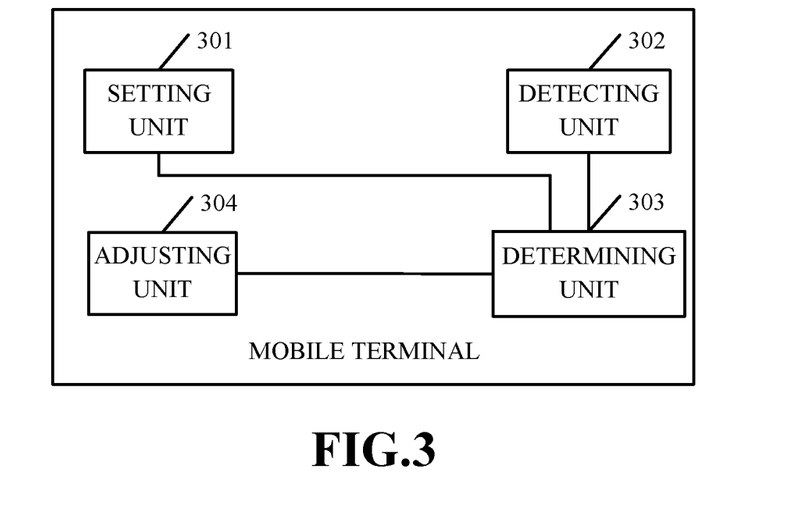
FIG. 3 is an illustrative structural diagram of a mobile terminal according to one implementation of the present disclosure.

FIG. 3 is an illustrative structural diagram of a mobile terminal according to one implementation of the present disclosure. As illustrated in FIG. 3, the mobile terminal includes a setting unit 301, a detecting unit 302, a determining unit 303, and an adjusting unit 304.

The setting unit 301 is configured to set an initial cut-off voltage and an initial charging current of a battery when the battery is subjected to constant current charging, where the initial cut-off voltage is greater than a safe cut-off voltage of the battery. A difference between the initial cut-off voltage and the safe cut-off voltage is less than or equal to a preset voltage difference.

Figure 4:
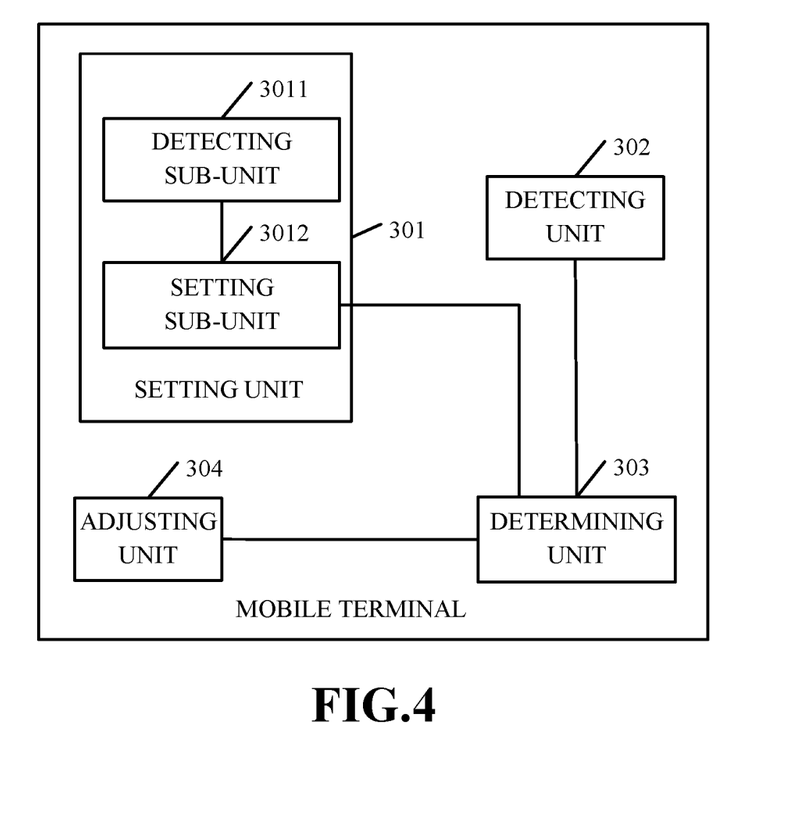
FIG. 4 is an illustrative structural diagram of a mobile terminal according to another implementation of the present disclosure.

In one implementation, as illustrated in FIG. 4, the setting unit 301 further includes a detecting sub-unit 3011 and a setting sub-unit 3012.

The detecting sub-unit 3011 is configured to detect the safe cut-off voltage of the battery.

The setting sub-unit 3012 is configured to set the initial cut-off voltage of the battery based on a mapping relationship between the safe cut-off voltage and an initial cut-off voltage.

The setting sub-unit 3012 is further configured to set the initial charging current of the battery based on a mapping relationship between the initial cut-off voltage and an initial charging current.

In one implementation of the present disclosure, different types of core materials of the battery include safe cut-off voltages. The detecting sub-unit 3011 controls a charging chip that detects the safe cut-off voltage of the battery. The mapping relationship between the safe cut-off voltage and the initial cut-off voltage is pre-stored in a mobile terminal. For example, safe cut-off voltage 4.25V corresponds to initial cut-off voltage 4.35V, safe cut-off voltage 4.3V corresponds to initial cut-off voltage 4.4V, and safe cut-off voltage 4.35V corresponds to initial cut-off voltage 4.45V. The mapping relationship between the initial cut-off voltage and the initial charging current is pre-stored in the mobile terminal. For example, the initial cut-off voltage 4.35V corresponds to the initial charging current 1000 mA, the initial cut-off voltage 4.4V corresponds to the initial charging current 1100 mA, and the initial cut-off voltage 4.45V corresponds to the initial charging current 1200 mA. The setting sub-unit 3012 sets the initial cut-off voltage of the battery based on a mapping relationship between the safe cut-off voltage and an initial cut-off voltage. The setting sub-unit 3012 further set the initial charging current of the battery based on a mapping relationship between the initial cut-off voltage and an initial charging current. In one implementation of the present disclosure, the setting sub-unit 3012 detects the safe cut-off voltage of the battery based on different types of core materials such that the initial cut-off voltage and the initial charging current of the battery are configured.

The detecting unit 302 is configured to detect a battery voltage of the battery, where the battery voltage is a sum of a real voltage of the battery and a voltage of an inner resistor of the battery.

In one implementation, the detecting unit 302 controls a charging chip of the mobile terminal that detects the battery voltage of the battery. It should be noted that, since an internal resistance (i.e., an inner resistor) exists in the battery during a charging, the detected battery voltage is defined as a voltage containing a voltage of the inner resistor of the battery and is greater than a real voltage of the battery.

The determining unit 303 is configured to determine whether the current battery voltage is equal to the initial cut-off voltage.

In one implementation, the determining unit 303 determines whether the current battery voltage is equal to the initial cut-off voltage. When the current battery voltage is less than the initial cut-off voltage, the battery is still in the constant current charging. The determining unit 303 continuously determines whether the current battery voltage is equal to the initial cut-off voltage. When the determining unit 303 determines that the current battery voltage is equal to the initial cut-off voltage, the adjusting unit 304 is triggered. When the determining unit 303 determines that the current battery voltage is unequal to the initial cut-off voltage, the determining unit 303 continuously determines whether the current battery voltage is equal to the initial cut-off voltage.

When the current battery voltage is equal to the initial cut-off voltage, the adjusting unit 304 is configured to gradually decrease the initial cut-off voltage and the initial charging current, until the initial cut-off voltage is less than or equal to the safe cut-off voltage, and to charge the battery in constant voltage charging when the current battery voltage is equal to the safe cut-off voltage, where a voltage of the constant voltage charging is the safe cut-off voltage.

In one implementation, when the current battery voltage is equal to the initial cut-off voltage, the adjusting unit 304 decreases the initial cut-off voltage and the initial charging current gradually. For example, the initial cut-off voltage is 4.35V, the safe cut-off voltage is 4.25V, and the initial charging current is 1000 mA. When the current battery voltage is 4.35V, the adjusting unit 304 adjusts the initial cut-off voltage to 4.34V and adjusts the initial charging current to 950 mA. When the current battery voltage is 4.34V, the adjusting unit 304 adjusts the initial cut-off voltage to 4.335V and adjusts the initial charging current to 925 mA. When the current battery voltage is 4.335V, the adjusting unit 304 adjusts the initial cut-off voltage to 4.32V and adjusts the initial charging current to 850 mA until the current battery voltage is less than or equal to 4.25V and then the battery is subjected to the constant voltage stage, where a voltage of the constant voltage stage is 4.25V. In one implementation, the setting unit 301 configures that the initial cut-off voltage of the battery is greater than the safe cut-off voltage. When the current battery voltage is equal to the initial cut-off voltage, the adjusting unit 304 gradually decreases the initial cut-off voltage and the initial charging current until the initial cut-off voltage is less than or equal to the safe cut-off voltage, and then the battery is subjected to the constant voltage stage. In one implementation, the constant current charging time of the battery increases and constant voltage charging time of the battery decreases such that total charging time of the battery can be reduced.

Figure 5:
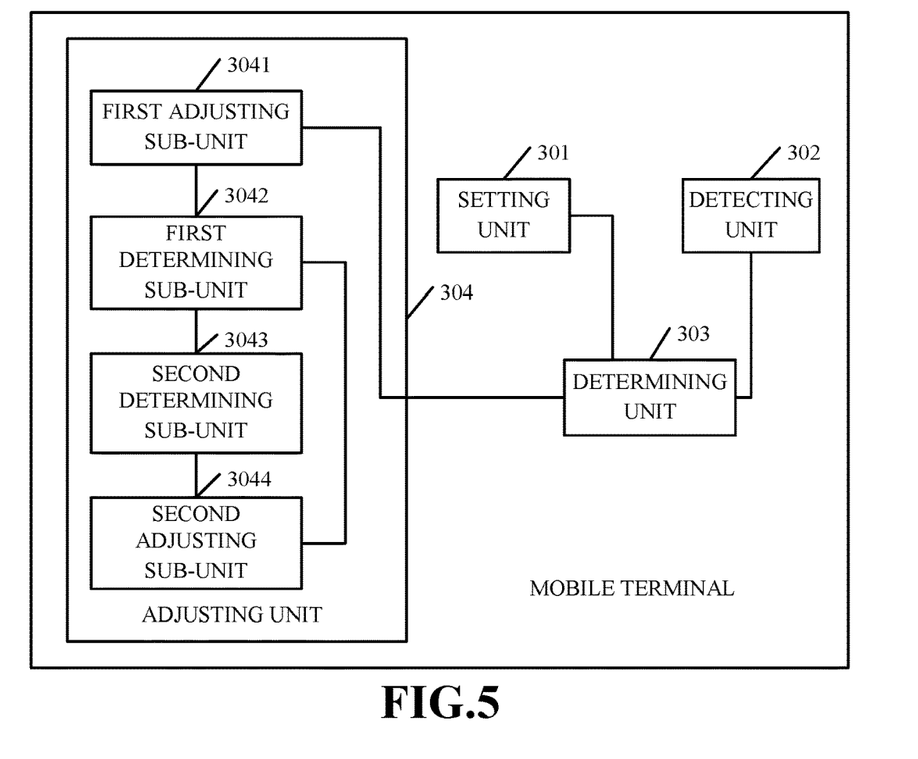
FIG. 5 is an illustrative structural diagram of a mobile terminal according to another implementation of the present disclosure.

In one implementation, as illustrated in FIG. 5, the adjusting unit 304 includes a first adjusting sub-unit 3041, a first determining sub-unit 3042, a second determining sub-unit 3043, and a second adjusting sub-unit 3044.

The first adjusting sub-unit 3041 is configured to decrease the initial cut-off voltage by a first preset value to function as a current cut-off voltage, and decreases the initial charging current by a second preset value to function as a current charging current.

The first determining sub-unit 3042 is configured to determine whether the current cut-off voltage is greater than the safe cut-off voltage.

The second determining sub-unit 3043 is configured to determine whether the current battery voltage is equal to the current cut-off voltage when the first determining sub-unit 3042 determines that the current cut-off voltage is greater than the safe cut-off voltage.

The second adjusting sub-unit 3044 is configured to decrease the current cut-off voltage by the first preset value to function as a new current cut-off voltage, and decrease the current charging current by a second preset value to function as a new current charging current when the second determining sub-unit 3043 determines that the current battery voltage is equal to the current cut-off voltage. The second adjusting sub-unit 3044 is configured to trigger the first determining sub-unit 3042 to determine whether the current cut-off voltage is greater than the safe cut-off voltage, and to charge the battery in the constant voltage charging when the first determining sub-unit 3042 determines that the current cut-off voltage is less than or equal to the safe cut-off voltage.

In one implementation, the adjusting unit 304 gradually decreases the initial cut-off voltage, where the adjustment sub-unit 3041 decreases the initial cut-off voltage by a first preset value to function as a current cut-off voltage. The adjusting unit 304 gradually decreases the initial charging current, where the adjustment sub-unit 3041 decreases the initial charging current by a second preset value to function as a current charging current. The first preset value can be selected from one group consisting of 10 mV, 15 mV, and 25 mV. The second preset value can be selected from one group consisting of 10 mA, 20 mA, and 25 mA. For example, the first preset value can be set as 25 mV and the second preset value can be set as 25 mA.

For example, the first preset value is 25 mV and the second preset value is 25 mA, in conjunction with FIG. 2, to describe the blocks 1041 through 1044 below.

FIG. 2 is an illustrative diagram of changes of charging current and a battery voltage over charging time according to one implementation of the present disclosure. As illustrated in FIG. 2, diagrams (a) and (b) in FIG. 2 depict the changes of charging current and the battery voltage over the charging time in a related art. Diagrams (c) and (d) depict the changes of charging current and the battery voltage over charging time according to one implementation of the present disclosure. For illustration convenience, FIG. 2 only illustrates the constant current charging and constant voltage charging. The diagram (a) depicts the change of the charging current over the charging time in the related art. The diagram (b) depicts the change of the battery voltage over the charging time in the related art. The diagram (c) depicts the change of the charging current over the charging time according to one implementation of the present disclosure. The diagram (d) depicts the change of the battery voltage over the charging time according to one implementation of the present disclosure.

As illustrated in FIG. 2, the initial cut-off voltage (i.e., $U_2$ in diagram (d)) is 4.35V, the safe cut-off voltage (i.e., $U_1$ in diagrams (b) and (d)) is 4.25V, and the initial charging current (i.e., $I_1$ in diagrams (a) and (c)) is 1000 mA. A final charging current (i.e., $I_2$ in diagrams (a) and (c)) is provided in the constant voltage charging. In the constant current charging, as the charging time increases, the battery voltage gradually increases from an initial voltage value (i.e., termed as $U_0$) that is greater than zero volts, where the charging current (i.e., the initial charging current) is 1000 mA. When the current battery voltage reaches 4.25V (i.e., the safe cut-off voltage), the battery directly is subjected to constant voltage stage in the related art. In one implementation of the present disclosure, since the initial cut-off voltage is set as 4.35V (i.e., $U_2$), the battery is continuously charged by 1000 mA. When the current battery voltage reaches 4.35V, the current battery voltage is equal to the initial cut-off voltage. Meanwhile, the adjustment sub-unit 3041 decreases the initial cut-off voltage (4.35V) by the first preset value (25 mV) to function as the current cut-off voltage (4.325V, e.g., termed as $U_3$), and decreases the initial charging current (1000 mA) by the second preset value (25 mA) to function as a current charging current (975 mA) so that the current battery voltage can be gradually decreased. The first determining sub-unit 3042 determines that the current cut-off voltage (4.325V) is greater than the safe cut-off voltage 4.25V. The second determining sub-unit 3043 determines whether the current battery voltage is equal to the current cut-off voltage (4.325V). If the current battery voltage is unequal to the current cut-off voltage (4.325V), the second determining sub-unit 3043 continuously determines whether the current battery voltage is equal to the current cut-off voltage (4.325V). Meanwhile, since the current battery voltage increases over the charging time and when the second determining sub-unit 3043 continuously determines that the current battery voltage is equal to the current cut-off voltage (4.325V), the second adjusting sub-unit 3044 decreases the current cut-off voltage (4.325V) by the first preset value (25 mV) to function as the current cut-off voltage (4.3V, e.g., termed as $U_4$), and decreases the current charging current (975 mA) by the second preset value (25 mA) to function as a new current charging current (950 mA) so that the current battery voltage can be gradually decreased. In this time, the battery is charged by the new current charging current (950 mA) in the constant current charging. The first determining sub-unit 3042 continuously determines that the current cut-off voltage (4.3V) is greater than the safe cut-off voltage 4.25V. The second determining sub-unit 3043 further determines whether the current battery voltage is equal to the current cut-off voltage (4.3V). If the current battery voltage is unequal to the current cut-off voltage (4.3V), the second determining sub-unit 3043 continuously determines whether the current battery voltage is equal to the current cut-off voltage (4.3V). When the current battery voltage is equal to the current cut-off voltage (4.3V), the second adjusting sub-unit 3044 decreases the current cut-off voltage (4.3V) by the first preset value (25 mV) to function as the current cut-off voltage (4.275V, e.g., termed as $U_5$), and decreases the current charging current (950 mA) by the second preset value (25 mA) to function as a new current charging current (925 mA) so that the current battery voltage can be gradually decreased. In this time, the battery is charged by the new current charging current (925 mA) in the constant current charging. The first determining sub-unit 3042 continuously determines that the current cut-off voltage (4.275V) is greater than the safe cut-off voltage 4.25V (i.e., $U_1$). The second determining sub-unit 3043 further determines whether the current battery voltage is equal to the current cut-off voltage (4.275V). If the current battery voltage is unequal to the current cut-off voltage (4.275V), the second determining sub-unit 3043 continuously determines whether the current battery voltage is equal to the current cut-off voltage (4.275V). When the current battery voltage is equal to the current cut-off voltage (4.275V), the second adjusting sub-unit 3044 decreases the current cut-off voltage (4.275V) by the first preset value (25 mV) to function as the current cut-off voltage (4.25V) and decreases the current charging current (925 mA) by the second preset value (25 mA) to function as a new current charging current (900 mA). In this time, the battery is charged by the new current charging current (900 mA) in the constant current charging. The first determining sub-unit 3042 continuously determines that the current cut-off voltage (4.25V) is equal to the safe cut-off voltage 4.25V. In this time, the battery is subjected to the constant voltage charging. As illustrated in FIG. 2, the charging time of the constant current charging is t1 and the charging time of the constant voltage charging is t2 in the related art. In one implementation of the present disclosure, the charging time of the constant current charging is t3 and the charging time of the constant voltage charging is t4. Although the charging time t3 is greater than the charging time t3, however, the charging time t4 is significantly less than the charging time t2. While charging the battery having same battery capacity, total charging time (t1+t2) is greater than total charging time (t3+t4) and thus, the total charging time of the battery effectively decreases according to one implementation of the present disclosure.

In one implementation, the difference between the initial cut-off voltage and the safe cut-off voltage is K times of the first preset value, where K is a positive integer.

For example, when the initial cut-off voltage is 4.35V and the safe cut-off voltage is 4.25V, the setting unit 301 sets the first preset value as 10 mV. The difference between the initial cut-off voltage and the safe cut-off voltage is 100 mV. Thus, the difference between the initial cut-off voltage and the safe cut-off voltage is ten times of the first preset value.

In the implementations of the present disclosure, when the battery is subjected to constant current charging, the setting unit 301 sets an initial cut-off voltage and an initial charging current of the battery, where the initial cut-off voltage is greater than the safe cut-off voltage of the battery. The difference between the initial cut-off voltage and the safe cut-off voltage is less than or equal to a preset voltage difference. The detecting unit 302 detects the battery voltage of the battery. The determining unit 303 determines whether the current battery voltage is equal to the initial cut-off voltage. When the current battery voltage is equal to the initial cut-off voltage, the adjusting unit 304 gradually decreases the initial cut-off voltage and the initial charging current, until the initial cut-off voltage is less than or equal to the safe cut-off voltage, and then the battery is subjected to the constant voltage stage, where a voltage of the constant voltage stage is the safe cut-off voltage. In one implementation, when the setting unit 301 configures that the initial cut-off voltage is greater than the safe cut-off voltage of the battery, the constant current charging time of the battery increases and the constant voltage charging time of the battery decreases such that total charging time of the battery can be reduced.

Figure 6:
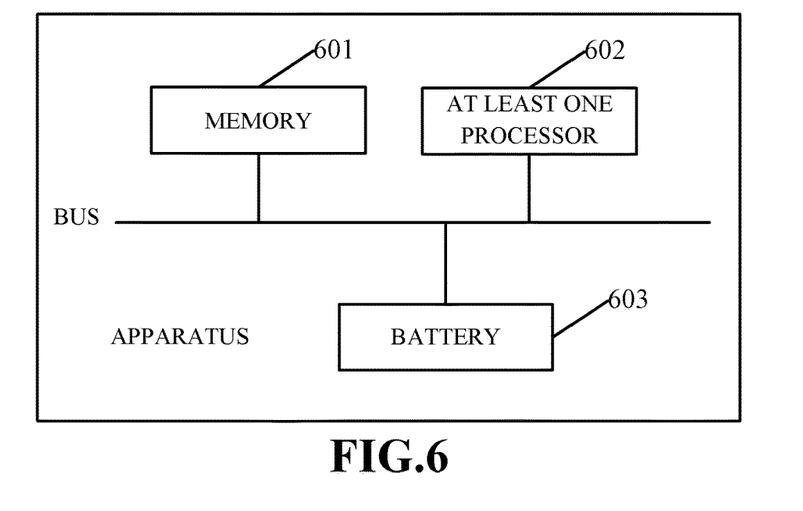
FIG. 6 is yet another illustrative structural diagram of a mobile terminal according to another implementation of the present disclosure.

FIG. 6 is yet another illustrative structural diagram of an apparatus (e.g., a mobile terminal) according to another implementation of the present disclosure. The apparatus can be a part of a mobile terminal or an electronic device. The apparatus also can be an entire mobile terminal or an entire other electronic device with function of charging method. As illustrated in FIG. 6, the apparatus includes a memory 601, at least one processor 602, and a battery 603, where the at least one processor 602 may be one or more processors and one processor is illustrated in FIG. 6. In one implementation, the memory 601, the at least one processor 602, and the battery 603 are connected using a bus (as illustrated in FIG. 6) or different connections. The memory 601 is configured to store program instructions. The at least one processor 602 is configured to call program instructions in the memory 601 and executes following operations.

When the battery 603 is subjected to constant current charging, an initial cut-off voltage and an initial charging current of the battery 603 are set, where the initial cut-off voltage is greater than a safe cut-off voltage of the battery 603. A difference between the initial cut-off voltage and the safe cut-off voltage is less than or equal to a preset voltage difference.

A battery voltage of the battery 603 is detected, where the battery voltage is a sum of a real voltage of the battery 603 and a voltage of an inner resistor of the battery 603.

Whether the current battery voltage is equal to the initial cut-off voltage is determined.

When the current battery voltage is equal to the initial cut-off voltage, the initial cut-off voltage and the initial charging current are gradually decreased, until the initial cut-off voltage is less than or equal to the safe cut-off voltage, and then the battery 603 is subjected to the constant voltage charging, where a voltage of the constant voltage charging is the safe cut-off voltage.

In one implementation, the at least one processor 602 gradually decreases the initial cut-off voltage and the initial charging current until the initial cut-off voltage is less than or equal to the safe cut-off voltage, and then the battery 603 is subjected to the constant voltage charging. The at least one processor 602 performs the following operations.

The initial cut-off voltage decreases by a first preset value to function as a current cut-off voltage, and the initial charging current decreases by a second preset value to function as a current charging current.

Whether the current cut-off voltage is greater than the safe cut-off voltage is determined.

When the current cut-off voltage is greater than the safe cut-off voltage, whether the current battery voltage of the battery 603 is equal to the current cut-off voltage is determined.

When the current battery voltage of the battery 603 is equal to the current cut-off voltage, the current cut-off voltage decreases by the first preset value to function as a new current cut-off voltage, and the current charging current decreases by a second preset value to function as a new current charging current. It is determined whether the current cut-off voltage is greater than the safe cut-off voltage until the current cut-off voltage is less than or equal to the safe cut-off voltage, and then the battery 603 is subjected to the constant voltage charging.

In one implementation, the at least one processor 602 performs the following operations.

When the current battery voltage of the battery 603 is unequal to the current cut-off voltage, whether the current battery voltage of the battery 603 is equal to the current cut-off voltage is continuously determined.

In one implementation, the difference between the initial cut-off voltage and the safe cut-off voltage is K times of the first preset value, where K is a positive integer.

That the at least one processor 602 sets an initial cut-off voltage and an initial charging current of the battery 603 includes the following operations.

A battery voltage of the battery 603 is detected.

Based on a mapping relationship between the safe cut-off voltage and an initial cut-off voltage, the initial cut-off voltage of the battery 603 is set.

Based on a mapping relationship between the initial cut-off voltage and an initial charging current, the initial charging current of the battery 603 is set.

In one implementation, the apparatus in FIG. 6 increases the constant current charging time of the battery and decreases constant voltage charging time of the battery such that total charging time of the battery can be reduced.

Persons skilled in the related art should be noted that all or part of actions in the above-described implementations can be implemented by program instructions executable in hardware. The program instructions are stored in computer-readable medium, where the "computer-readable medium" includes flash disks, a read-only memory (ROM), a random access memory (RAM), magnetic devices, and optic devices.

A charging method and a terminal according to the above-mentioned implementations of the present disclosure are clearly described. As is understood by a person skilled in the art, the foregoing preferred implementations of the present disclosure are illustrative rather than limiting of the present disclosure. It is intended that they cover various modifications and similar arrangements be included within the spirit and scope of the present disclosure, the scope of which should be accorded the broadest interpretation so as to encompass all such modifications and similar structures.

What is claimed is:

1. A charging method, comprising:
    setting an initial cut-off voltage and an initial charging current of a battery when the battery is subjected to constant current charging, the initial cut-off voltage being greater than a safe cut-off voltage of the battery, and a difference between the initial cut-off voltage and the safe cut-off voltage being less than or equal to a preset voltage difference;
    detecting a battery voltage of the battery, the battery voltage being a sum of a real voltage of the battery and a voltage of an inner resistor of the battery;
    determining whether the current battery voltage is equal to the initial cut-off voltage; and
    decreasing the initial cut-off voltage and the initial charging current gradually based on a determination that the current battery voltage is equal to the initial cut-off voltage, until the initial cut-off voltage is less than or equal to the safe cut-off voltage, and charging the battery in constant voltage charging when the current battery voltage is equal to the safe cut-off voltage, a voltage of the constant voltage charging being the safe cut-off voltage.

2. The method of claim 1, wherein decreasing the initial cut-off voltage and the initial charging current gradually until the initial cut-off voltage is less than or equal to the safe cut-off voltage and charging the battery in constant voltage charging comprises:
    decreasing the initial cut-off voltage by a first preset value to function as a current cut-off voltage and decreasing the initial charging current by a second preset value to function as a current charging current;
    determining whether the current cut-off voltage is greater than the safe cut-off voltage;
    determining whether the current battery voltage is equal to the current cut-off voltage based on a determination that the current cut-off voltage is greater than the safe cut-off voltage;
    decreasing the current cut-off voltage by the first preset value to function as a new current cut-off voltage and decreasing the current charging current by the second preset value to function as a new current charging current based on a determination that the current battery voltage is equal to the current cut-off voltage;
    determining whether the current cut-off voltage is greater than the safe cut-off voltage until the current cut-off voltage is less than or equal to the safe cut-off voltage; and
    charging the battery in the constant voltage charging when the current cut-off voltage is less than or equal to the safe cut-off voltage.

3. The method of claim 1, further comprising:
    determining whether the current battery voltage is equal to the initial cut-off voltage continuously based on a determination that the current battery voltage is unequal to the initial cut-off voltage.

4. The method of claim 2, wherein the difference between the initial cut-off voltage and the safe cut-off voltage is K times of the first preset value, and K is a positive integer.

5. The method of claim 1, wherein setting the initial cut-off voltage and the initial charging current of the battery comprises:
    detecting the safe cut-off voltage of the battery;

setting the initial cut-off voltage of the battery according to a mapping relationship between the safe cut-off voltage and the initial cut-off voltage; and setting the initial charging current of the battery according to a mapping relationship between the initial cut-off voltage and the initial charging current.

6. The method of claim 2, wherein setting the initial cut-off voltage and the initial charging current of the battery comprises:

detecting the safe cut-off voltage of the battery;

setting the initial cut-off voltage of the battery according to a mapping relationship between the safe cut-off voltage and the initial cut-off voltage; and setting the initial charging current of the battery according to a mapping relationship between the initial cut-off voltage and the initial charging current.

7. The method of claim 3, wherein setting the initial cut-off voltage and the initial charging current of the battery comprises:

detecting the safe cut-off voltage of the battery;

setting the initial cut-off voltage of the battery according to a mapping relationship between the safe cut-off voltage and the initial cut-off voltage; and setting the initial charging current of the battery according to a mapping relationship between the initial cut-off voltage and the initial charging current.

8. The method of claim 4, wherein setting the initial cut-off voltage and the initial charging current of the battery comprises:

detecting the safe cut-off voltage of the battery;

setting the initial cut-off voltage of the battery according to a mapping relationship between the safe cut-off voltage and the initial cut-off voltage; and setting the initial charging current of the battery according to a mapping relationship between the initial cut-off voltage and the initial charging current.

9. A mobile terminal, comprising:

a setting unit, configured to set an initial cut-off voltage and an initial charging current of a battery when the battery is subjected to constant current charging, wherein the initial cut-off voltage is greater than a safe cut-off voltage of the battery, and a difference between the initial cut-off voltage and the safe cut-off voltage is less than or equal to a preset voltage difference;

a detecting unit, configured to detect a battery voltage of the battery, wherein the battery voltage is a sum of a real voltage of the battery and a voltage of an inner resistor of the battery;

a determining unit, configured to determine whether the current battery voltage is equal to the initial cut-off voltage; and an adjusting unit, configured to decrease the initial cut-off voltage and the initial charging current gradually when the determining unit determines that the current battery voltage is equal to the initial cut-off voltage, until the initial cut-off voltage is less than or equal to the safe cut-off voltage, and to charge the battery in constant voltage charging when the current battery voltage is equal to the safe cut-off voltage, wherein a voltage of the constant voltage charging is the safe cut-off voltage.

10. The mobile terminal of claim 9, wherein the adjusting unit comprises:

a first adjusting sub-unit, configured to decrease the initial cut-off voltage by a first preset value to function as a current cut-off voltage, and to decrease the initial charging current by a second preset value to function as a current charging current;

a first determining sub-unit, configured to determine whether the current cut-off voltage is greater than the safe cut-off voltage;

a second determining sub-unit, configured to determine whether the current battery voltage is equal to the current cut-off voltage when the first determining sub-unit determines that the current cut-off voltage is greater than the safe cut-off voltage; and a second adjusting sub-unit, configured to decrease the current cut-off voltage by the first preset value to function as a new current cut-off voltage and to decrease the current charging current by the second preset value to function as a new current charging current when the second determining sub-unit determines that the current battery voltage is equal to the current cut-off voltage, to trigger the first determining sub-unit to determine whether the current cut-off voltage is greater than the safe cut-off voltage until the first determining sub-unit determines that the current cut-off voltage is less than or equal to the safe cut-off voltage, and to charge the battery in the constant voltage charging when the first determining sub-unit determines that the current cut-off voltage is less than or equal to the safe cut-off voltage.

11. The mobile terminal of claim 9, wherein the determining unit is configured to determine whether the current battery voltage is equal to the initial cut-off voltage continuously when the determining unit determines that the current battery voltage is unequal to the initial cut-off voltage.

12. The mobile terminal of claim 10, wherein the difference between the initial cut-off voltage and the safe cut-off voltage is K times of the first preset value, and K is a positive integer.

13. The mobile terminal of claim 9, wherein the setting unit comprises:

a detecting sub-unit, configured to detect the safe cut-off voltage of the battery;

a setting sub-unit, configured to set the initial cut-off voltage of the battery according to a mapping relationship between the safe cut-off voltage and the initial cut-off voltage; and the setting sub-unit being further configured to set the initial charging current of the battery according to a mapping relationship between the initial cut-off voltage and the initial charging current.

14. The mobile terminal of claim 10, wherein the setting unit comprises:

a detecting sub-unit, configured to detect the safe cut-off voltage of the battery;

a setting sub-unit, configured to set the initial cut-off voltage of the battery according to a mapping relationship between the safe cut-off voltage and the initial cut-off voltage; and the setting sub-unit being further configured to set the initial charging current of the battery according to a mapping relationship between the initial cut-off voltage and the initial charging current.

15. The mobile terminal of claim 11, wherein the setting unit comprises:

a detecting sub-unit, configured to detect the safe cut-off voltage of the battery;

a setting sub-unit, configured to set the initial cut-off voltage of the battery according to a mapping relationship between the safe cut-off voltage and the initial cut-off voltage; and the setting sub-unit being further configured to set the initial charging current of the battery according to a mapping relationship between the initial cut-off voltage and the initial charging current.

16. The mobile terminal of claim 12, wherein the setting unit comprises:
 a detecting sub-unit, configured to detect the safe cut-off voltage of the battery;
 a setting sub-unit, configured to set the initial cut-off voltage of the battery according to a mapping relationship between the safe cut-off voltage and the initial cut-off voltage; and
 the setting sub-unit being further configured to set the initial charging current of the battery according to a mapping relationship between the initial cut-off voltage and the initial charging current.

\* \* \* \* \*